Figure 2:
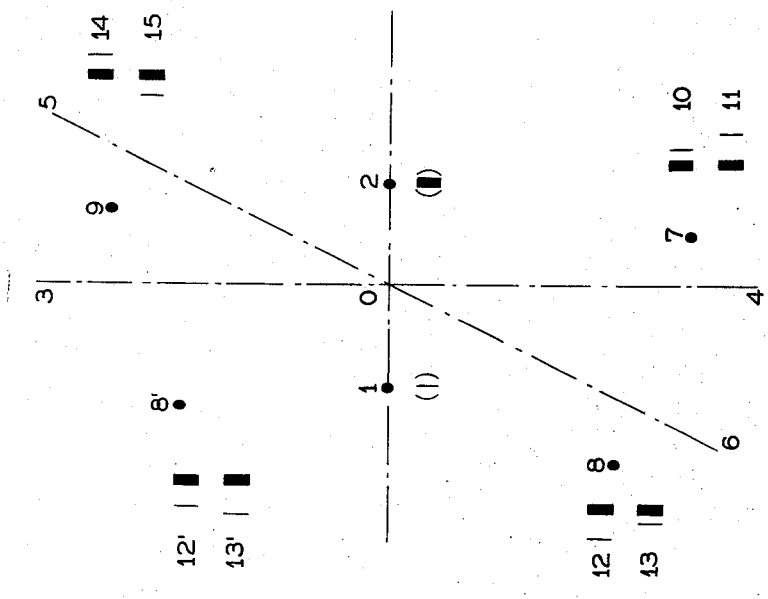

Oct. 7, 1958    F. G. BAC    2,855,594
RADIO DETECTION AND DISTANCE INDICATOR
Filed Dec. 4, 1941    4 Sheets-Sheet 1

INVENTOR.
FERNAND GEORGES BAC
BY
E. D. Phinney
ATTORNEY

INVENTOR.
FERNAND GEORGES BAC
BY
*E. D. Phinney*
ATTORNEY

Oct. 7, 1958  F. G. BAC  2,855,594
RADIO DETECTION AND DISTANCE INDICATOR
Filed Dec. 4, 1941  4 Sheets-Sheet 3
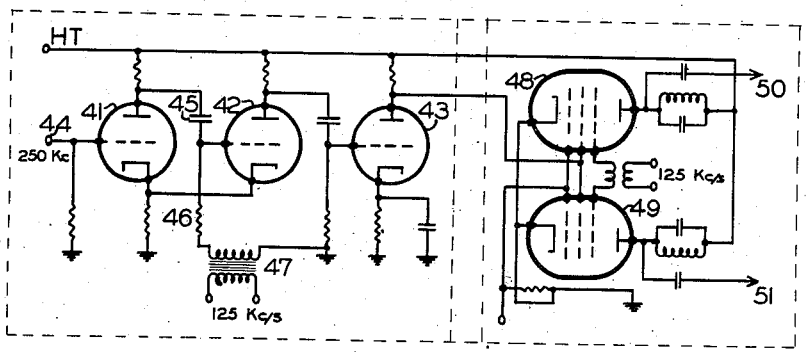
FIG. 6
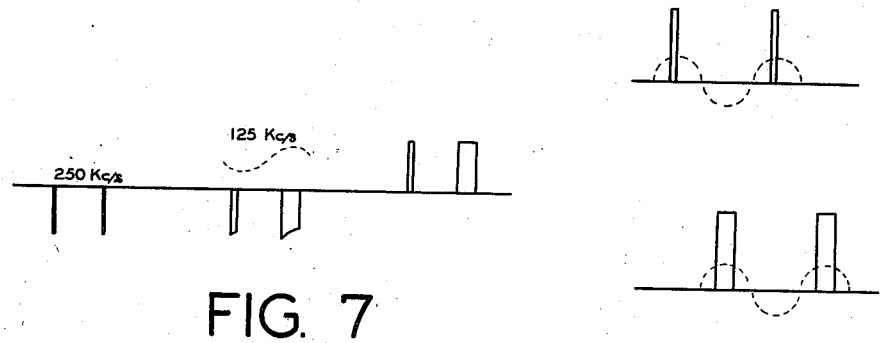
FIG. 7
FIG. 8
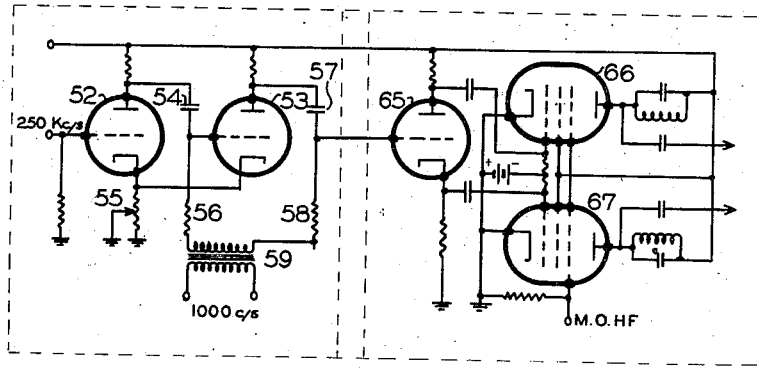
FIG. 9
INVENTOR.
FERNAND GEORGES BAC
BY
*E. D. Phinney*
ATTORNEY

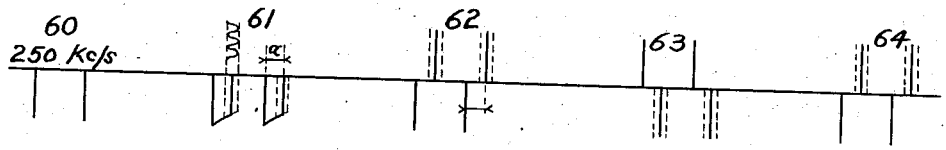
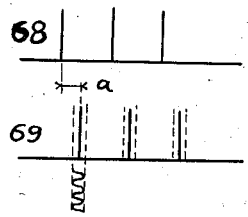
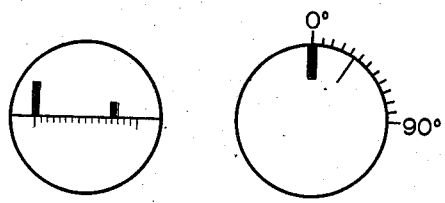
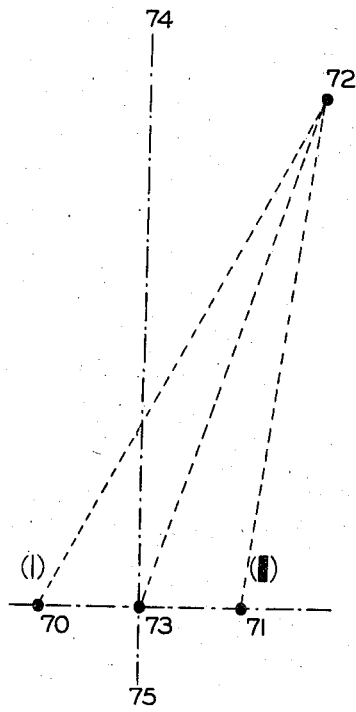
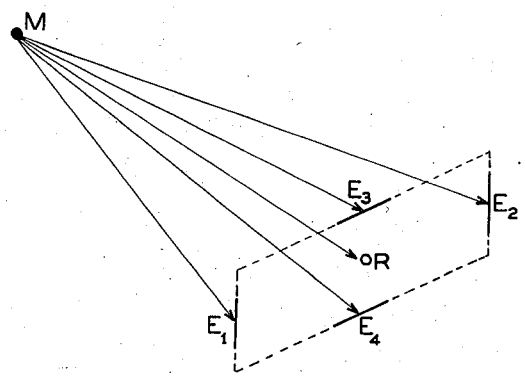

United States Patent Office 2,855,594
Patented Oct. 7, 1958

2,855,594

RADIO DETECTION AND DISTANCE INDICATOR

Fernand Georges Bac, Lyon, France, assignor to International Standard Electric Corporation, New York, N. Y., a corporation of Delaware Application December 4, 1941, Serial No. 421,562

Claims priority, application France March 5, 1941

30 Claims. (Cl. 343—103)

The present invention relates to radio distance and direction indicators, such as blind landing systems, radiogoniometers, telemeters, etc.

According to characteristics of the invention, two transmitters are placed at a certain distance apart, and simultaneously transmit impulses of short duration. When a receiver is located at equal distances from the two transmitters, that is to say in the plane perpendicular to the line joining the two transmitters and passing through the center of this line, the two impulses are received coincidently, whereas if the receiver is moved away from this plane, the two impulses are no longer received simultaneously and their separation is an indication of the position of the receiver in relation to the axis of the system.

In the system according to the invention, the radiation diagrams of the transmitters can be of any shape, the directivity of the aerial having an influence on the range of the radio beacon in certain directions, but having no influence on the measurements of the angles and distances which are made according to the means described. Moreover echos that are produced by the reflexion of the electro-magnetic waves on metallic obstacles will appear at the receiver in the form of supplementary impulses but they will be of relatively weak amplitude and need not be confused with the primary signals since they may be eliminated by the use of a threshold device. With, however, systems using interlaced diagrams, the unwanted reflections on obstacles alter the shape of the diagrams and often produce misleading image reference axes.

Moreover, in systems dependent upon radiation diagrams, the directivity of the aerials is a hindrance to rapid changes of the beacon axis direction. On the other hand, according to characteristics of the present invention, it is possible to turn the beacon axis instantaneously without affecting directivity of the aerials.

According to another advantage of the invention, the impulses which are transmitted by the radiobeacon can be submitted to a double modulation or a multiple modulation which permits the simultaneous use of the beacon for telephone or telegraph message transmissions. The combination of a multiple modulation and of the rotation of the beacon axis makes it possible to provide several distinct channels which can be used simultaneously.

The utilization of the described system makes it possible to obtain simultaneously with the same radiobeacon, a radioguiding system which enables a vehicle to determine its own position by itself, and a radiodetection device for detecting the position of the vehicle.

Figure 1:
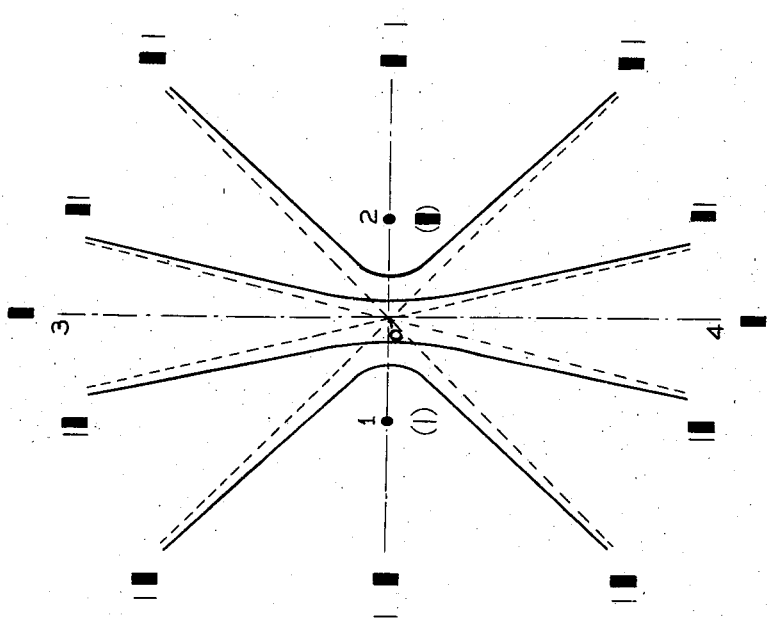
Figure 3:
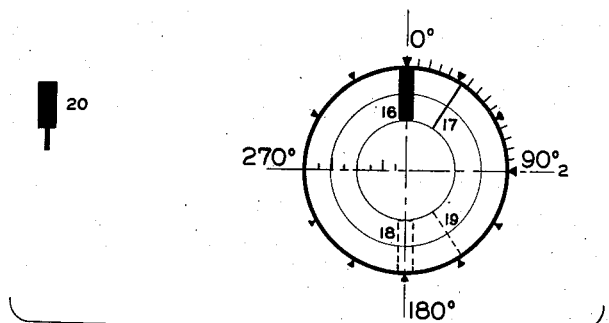
Figure 4:
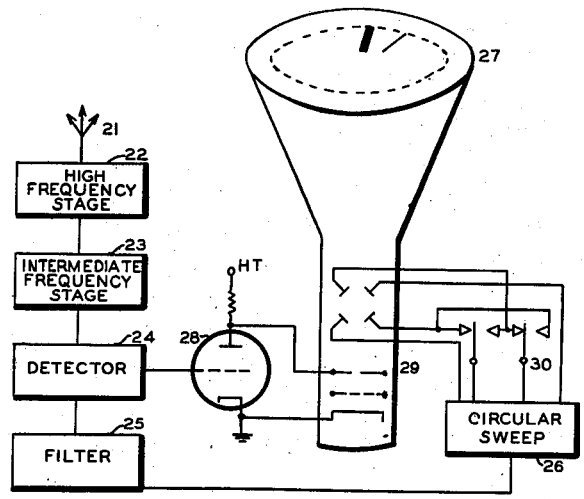
Figure 5:
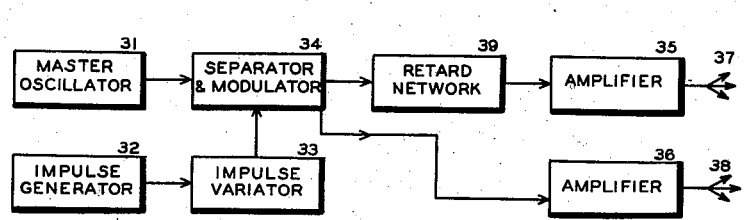

Other characteristics and objects of the invention will appear upon reading the following description of some embodiments of the invention with reference to the accompanying drawings in which:

Fig. 1 is a diagram used in the description.
Fig. 2 is another diagram used in the description.
Fig. 3 represents the image seen on the cathode ray oscillograph screen in accordance with an embodiment of the invention.
Fig. 4 represents an embodiment of a receiver incorporating features of the invention.
Fig. 5 represents the general layout of a transmitter.
Fig. 6 shows an embodiment of a modulator and of an electronic separator utilized in the transmission.
Fig. 7 shows the different steps in the generation of the impulses.
Fig. 8 shows another step in the generation of the impulses.
Fig. 9 shows a different embodiment for the transmission of impulses.
Fig. 10 represents the different steps in the generation of impulses corresponding to this embodiment.
Fig. 11 represents another step in the generation of impulses.
Fig. 12 shows an embodiment of a detector of obstacles according to the invention.
Fig. 13 shows an example of a receiver for an obstacle detector according to the invention.
Fig. 14 shows an example of the invention applied to a device for aiming sight toward an object.

Turning back to Fig. 1, the reference number 1 represents a first transmitter of impulses and then number 2 a second transmitter, which are separated 600 meters apart, for example.

In the plane 3—4 perpendicular to the line joining the transmitter and passing through the middle 0 of this line, a receiver will simultaneously receive the impulses that are transmitted by transmitters 1 and 2.

If the receiver is located in the quadrant 2—0—3, it will receive the impulses coming from the transmitter 2 before those coming from the transmitter 1. It is the same for the quadrant 2—0—4. On the contrary, if it is located in the quadrant 1—0—3 or 1—0—4 it will receive the impulses coming from 1 before those coming from 2.

To determine whether the receiver is located in the quadrants 2—0—3 and 2—0—4 or in the quadrants 1—0—3 and 1—0—4, the impulses can be differentiated by suitable means such as by the use of two impulses of different duration as shown on the drawing, the transmitter 1 sending shorter impulses than the transmitter 2.

The reception has thus the form of a brief impulse followed by a longer impulse in the quadrants 1—0—3 and 1—0—4, and by a long impulse followed by a short impulse in the quadrants 2—0—3 and 2—0—4.

Various devices may be used to observe the pulses that are received. According to a preferred embodiment of the invention, these pulses are observed on a cathode ray oscillograph, scanned in synchronism with the rate of the transmission of impulses. The curves shown on Fig. 1 are obtained for the different points of the plane. It is clear that the locus of the points for which the interval between the two impulses is constant is a rectangular hyperbola, taking into account that it determines the points for which the difference of the distances of the transmitters 1 and 2 is constant. In Fig. 1, 4 hyperbolas of this type are shown. It can be seen that if the distance between the two transmitters 1 and 2 is short in comparison with the distance between the receiver and the transmitter, the hyperbolas are practically reduced to straight lines. If the receiver is sufficiently far away, the hyperbolas practically merge with their asymptotes which all pass through the center 0 of the line 1—2 connecting the transmitter. If, for example, the receiver is mounted on an airplane, the pilot will thus be able to ascertain his angular position. This is an advantage over the devices in which an axis is determined by interlaced diagrams, since these devices do not permit the determination of the angular position in relation to the radiobeacon and the pilot is obliged to move sideways to search for the axis, whereas in the device according to the present invention, it is possible to guide the plane directly towards the radiobeacon.

It is not necessary that the pulses transmitted by the two antennas should be simultaneous. A de-timing of these pulses causes a rotation of the axis on which the pulses are received simultaneously. In this way, the direction of the channel can be easily and instantaneously changed without it being necessary to change the adjustment or the arrangement of the aerials.

When the receiver is located on the beacon axis 3—4 or near this axis, a rotation of the axis in a given direction will produce on the views seen on the cathode ray tube, a displacement of the long pulse with regard to the narrow pulse, in one direction or in another, according to whether the receiver is on one side or the other of the line 1—2 connecting the transmitters of the radiobeacon. By causing a periodical rotation of the axis, it is easy to determine if the receiver is in front or back of the radiobeacon.

Turning to Fig. 2 suppose, to clear the ambiguity, that the axis 3—4 is periodically displaced into the position 5—6. If a receiver is located, for example, at 7, it is clear that when the axis is displaced to 5—6, this corresponds to retarding the short impulse transmitted by the transmitter 1, with regard to the long impulse transmitted by the transmitter 2. The receiver placed at 7 will thus receive (when the transmission is such that the beacon axis is the normal axis 3—4) on its oscillograph an image as represented at 10 which becomes an image represented at 11 when the direction 5—6 is given to the beacon axis. It would be the same if the receiver were placed in the quadrant 1—0—3, except for reversal of positions of the long and short impulses.

Considering now a receiver placed at 8, the displacement of the beacon axis from 3—4 to 5—6 has the effect of bringing together images of the impulses on the screen of the oscillograph, and these images changes from form 12 to form 13. If the receiver is located between the two axes 3—4 and 5—6, a reversal of the position of the long impulse in relation to the short impulse is obtained on the cathode ray oscillograph. This would be the case for a receiver placed at 9 for which the image shown on the oscillograph changes from form 14 to form 15.

With appropriate conditions, it is possible for the pilot to determine on the one hand, his angular position in regard to a beacon axis 3—4 and whether he is in front of or back of the axis 1—2 connecting the transmitters.

If, as shown in Fig. 2, the receiver be in quadrant 1—0—3, at position 8', the pilot under normal axis conditions may see on the screen images appearing at 12'. Upon shift of axis to 5—6, this image indication is represented by 13'. Here the short pulse has shifted farther to the left. The contrast between these indications and those for a position 8 in quadrant 1—0—4 will enable a distinction to be made between positions in front or back of the line of transmitters.

Since the operator on the airplane or other vehicle knows his angular position constantly in relation to the beacon axis, it is possible for him to pick out and to follow a secondary axis by maintaining constant the spacing of the received pulses.

The addition of a device enabling the pilot to determine his distance in relation to the transmitters—such as a device for field intensity measurements—would give him his position completely. To this end, it might be useful to utilize the variation of the amplitude of the oscillograph images.

At the receiver for the oscillographic observation, it may be convenient to use a circular time base, so as to facilitate the observation and the measurement of the angular position of the vehicle with regard to the beacon channel as represented on Fig. 3. The synchronization of the time base can be obtained for example, by using either the modulated pulses or the non-modulated pulses as reference.

It is possible to obtain directly on the circular screen of the oscillograph the indication of the angular position. For this, it is necessary on the one hand, to choose the rate of the impulses according to the distance separating the transmitters 1—2 so that the maximum difference between the times of travel of the impulses—in other words, the duration of propagation of the electromagnetic waves, for a distance equal to the distance 1—2 separating the transmitters—will be ¼ of the period of emission of the impulses, and on the other hand to use a sweep frequency equal to half of the frequency of the impulses. Under these conditions, when the receiver is on the axis 1—2, the spacing between the two impulses will be equal to one quarter of the circumference of the screen of the oscillograph, in other words, at 20°, showing exactly the direction of the radiobeacon.

If the synchronization is made on the long impulse, the latter will always appear on the screen of the oscillograph at a fixed point, for example, in position 16 on Fig. 3. The luminous line corresponding to the short impulse will appear in the upper quadrant on the left or on the right (for example position 17) depending whether the airplane is on the right or on the left of the beacon axis 3—4 (Fig. 1). There remains to be determined whether the receiver is in front of or back of the transmitters. By the use of the means described with regard to Fig. 2, a periodic displacement of the image on the oscillograph of the short impulse is obtained.

If the rate of the temporary displacement of the axis is reduced in relation to the rate of the transmission of impulses, there will be seen on the oscillograph an image of the short impulse followed on one side by a flash. According as one is in front of or back of the transmitters, the flash will be on the right or on the left of the impulse as seen on Fig. 3.

It is possible to obtain on the screen of the oscillograph a direct reading of the angle with its sense, in other words, a reading on a 360° scale, by inverting the figure and changing the origin and the sense of the sweep of the cathode ray oscillograph, which can be done by changing the connections to the deflecting plates of the cathode ray oscillograph, whereupon the images of the impulses change from position 16 and 17 to positions 18 and 19 as shown in Fig. 3. Fig. 4 shows an embodiment of such type of receiver.

In this embodiment, the antenna 21 is connected to a receiver including, for example, a high frequency stage 22 and an intermediate frequency stage 23 followed by a detector 24.

The circuit 25 is a filter which permits the elimination of either one of the two signals, the short impulses or the long impulses. At the output of this circuit, there appears only one series of impulses which is used for the synchronization of circular sweep circuit 26 for a cathode ray oscillograph 27.

The signals that are received by the receiver, which include both long and short impulses, are applied to a coupling tube 28, which is, for example, used to impress a modulation potential on the anode 29 of the cathode ray tube. The rest of the control circuit of the cathode ray tube has not been illustrated, as it can be of any suitable type.

The radial modulation which results from the signal impulses causes the appearance of one fixed image which corresponds to the impulse upon which the sweep of the oscillograph is synchronized, and an image whose position varies with the angular spacing of the receiver respecting the axis of the transmitters.

In Fig. 3, the fixed image 16 can be seen, which corresponds to the long impulse, and the image 17 shows the short impulse which is used to measure the angular spacing.

When the receiver is located on the axis, the two impulses are superposed and an image as represented at 20 is obtained.

If the receiver does not include a limiter device, the amplitude of the images of the impulses can be used as a measure of the filled intensity and of the distance to the transmitter, accordingly, a graduated scale can be provided as shown in Fig. 3 consisting of a series of concentric circles.

As already explained, the image appearing on the screen of the oscillograph is the same whether the receiver is in front or the back. This ambiguity may be removed by the method described above by changing the direction of the sweep and the origin, which is done by means of a key 30 that inverts the connections to a pair of plates of the oscillograph.

Fig. 5 represents an embodiment of a transmitting system. In this figure, 31 represents a master oscillator, which generates the transmission carrier frequency of, for example, 50 megacycles.

32 is an impulse generator of any type producing short impulses regularly spaced, the rate of which is chosen in relation to the distance between antennas 37 and 38, for example, 250 kilocycles for antennas 600 meters apart.

33 is a device which permits the variation of the length of the impulses that are produced by the impulse generator 32 so that they will be alternately of short and long duration.

This can be obtained by various ways of which two examples will be given.

34 is an electronic separator which is made to separate and direct on two different paths the short and long impulses. In this separator a modulation of the carrier current is produced in such a way that in the output circuit of this apparatus, long and short impulses of high frequency are obtained.

These impulses are applied to power amplifiers 33 and 36 which feed the two antennas 37 and 38. A retardation network 39 is used to under coincident the transmission of the long and short impulses by the two aerials or to de-time them as required for the purpose previously described.

Fig. 6 represents an example of an embodiment of the pulse modulator and electronic separator 34. This device includes two tubes 41 and 42 connected as a multivibrator, but with only one grid-plate condenser 45 instead of the usual two. For example, the short pulses at 250 kc. coming from the generator 32 are applied to the grid 44 of the tube 41. If these impulses are negative, they cause the plate current of the tube 41 to become zero, and consequently produce an abrupt increase of the grid potential of the tube 42 and the plate current of this tube.

The condenser 45 which is charged, discharges through the resistance 46 producing an abrupt decrease of grid potential of tube 42 and the plate current of this tube comes back to its initial value.

If a sinusoidal frequency of half the frequency of the impulses (125 kc.) is superposed on the grid of the tube 42, one operation out of two is advanced and the other delayed in such a way that alternate short and long impulses are obtained.

This auxiliary potential which is derived from the same generator which was used to produce the input impulses, may be applied by means of a transformer 47.

The negative impulses coming from the tube 42 are reversed and amplified by the tube 43.

The different stages in the production of the impulses are represented in Fig. 7.

On the left hand side are represented the input impulses, in the middle the modulated impulses at the output of the tube 42 acting as a trigger circuit, and on the right are the output impulses.

These output impulses are applied to an electronic separator shown to the right of Fig. 6 and including two tubes 48 and 49 which receive the impulses on their screen grids. On the control grids of those tubes the carrier current is applied, and on the suppressors (for example) a frequency of 125 kc. which suppresses one impulse out of two, the long impulse for tube 48 and the short impulse for tube 49.

The result is that one obtains respectively on the leads 50 and 51 going to the power amplifiers, the impulses represented in Fig. 8.

Fig. 9 represents an alternative embodiment of the invention in which instead of two impulses, one short and one long, two short impulses have been used, one being modulated by time displacement at a sufficient rate to give to the observer the impression of a long impulse on the cathode ray oscillograph.

This device includes a trigger circuit that is similar to the one of Fig. 6.

The operation of the tubes 52 and 53 is the same as for the tubes 41 and 42; and the condenser 54 and resistance 56 have the same function as the condenser 45 and the resistance 46. The rheostat 55 is used to vary the instant of occurrence of the trigger operation when there is no modulation.

A sinusoidal frequency is applied to the transformer 59, for example of 1000 cycles, which makes the moment of occurrence of the trigger operation vary periodically. In Fig. 10 is shown at 60 the input impulses and at 61 the impulses at the output of the trigger circuit, the beginning of which remains at a fixed position and the end varying in time at the rate of 1000 cycles. By means of the condenser 57 and resistance 58 of appropriate value, the derivative of the impulses 61 is taken and one obtains, as shown at 62, two impulses of opposite signs, one being negative corresponding to the beginning of impulse 61 which is fixed, and one positive which is modulated in time at the rate of 1000 cycles. The operator will observe the latter on the cathode ray tube as an impulse of longer duration. The interval between the fixed impulse and the median position of the variable impulse can be adjusted for example by the rheostat 55. The transmissions of the two antennas are in this case no longer simultaneous and this appears on the receiver as a shift of the orientation of the beacon axis.

The separator which is represented to the right of Fig. 9 includes a coupling tube 65 with which it is possible to separate impulses 62 in two different paths with inversed polarities, in other words, as is represented at 63 for the upper path, and as is represented at 64 for the lower path.

These signals of opposite signs are applied to two amplifying tubes 66 and 67 with a threshold clipping adjustment with which one obtains at the output, signals having the shape represented on Fig. 11 at 68 and 69.

The invention in addition to its application to radio direction finding and course indicating is also applicable to obstacle detection. An embodiment of this application of the invention is represented on Fig. 12. In this figure, the two transmitters are shown at 70 and 71; 72 shows the object whose position is to be discovered, for example, an airplane, and 73 is a receiver that can be placed, for example, between the two transmitters 70 and 71. This receiver is placed in such a way so as to receive the reflected impulses from airplane 72 as well as the direct impulses sent by the transmitters 70 and 71. According to known methods, a sweep can be produced having the cadence of the impulses emitted by the transmitters and then synchronized by direct reception between the transmitters and the receiver. The reflected impulses are seen on the cathode ray oscillograph at a certain distance which depends on the length of time these impulses take to go to the obstacle and come back. Thus according to known procedure, the screen of the oscillograph can be graduated in distances by using, for example, rectilinear sweep. The reflected impulses are double and include the short impulse sent by the transmitter 70 and the long impulse transmitted by the transmitter 71. The distance between these two echos corresponds to the measurement of the angular position of the airplane 72 in relation to the axis 74—75. The means already described can be employed to obtain a direct reading of the angular position of the airplane on the oscillograph.

If the sweep is rectilinear, there will be seen on the screen of the oscillograph the direct impulse 76 and the two reflected impulses 77 and 78. The space between these two reflected impulses gives the angular direction; the space between the reference impulse 76 and the mean of the two impulses 77 and 78—which are very near each other—gives the distance.

In order to facilitate the measurements, it is preferable to use two reading devices: one with a rectilinear sweep, for example, giving the distance by measuring the time it takes between the transmitted impulse and the receipt of the echo (Fig. 13 to the left) and the other with a circular sweep giving the angular spacing corresponding to the interval separating the moments when the reflected short impulses and the reflected long impulses are received, according to the means described above (Fig. 13 to the right).

The detecting systems that have just been described can be utilized to search for fixed or movable obstacles, either for the purpose of avoiding them or on the other hand, in order to overtake them.

The described means are specially applied for blind search.

To this effect, Fig. 14 shows an airplane provided with two systems for transmitting pulses, one with two aerials E1 and E2 placed in a horizontal position, and the other one with two aerials E3 and E4 placed in a vertical position. The two systems alternatively transmit pulses at the same frequency, or simultaneously transmit pulses with different frequencies. These pulses which are reflected by the metallic body M of the pursed airplane, come back as echos towards the observer, and are received by a receiver R at a suitable location 0.

One or two receivers—according to whether the transmitted pulses have or do not have the same frequency—that are placed on the same airplane permit the receiving of the transmitted pulses and the echos, these being applied to two cathode ray oscillographs with which the direction and the altitude can be found. By using a circular time base, it is possible to find the direction and the altitude with only one oscillograph.

Other obvious modifications may arise which are within the scope of the invention as defined in the appended claims.

I claim:

1. A system for indicating position comprising two spaced radiating means, means for emitting from said respective radiating means signal impulse wave trains of the same carrier frequency and impulse periodicity but having differing characteristics, and a receiving device comprising indicating means for indicating by separation the difference in the times of arrival of said impulses at said receiving device.

2. A system for indicating position comprising two spaced radiating means, means for emitting from said respective radiating means signal impulse wave trains of the same carrier frequency and impulse periodicity but of differing impulse duration, and a receiving device comprising indicating means for indicating the difference in the times of arrival of said impulses at said receiving device.

3. A system according to claim 2, wherein the two spaced radiating means provide a beacon with a predetermined axis, and wherein retardation means is provided at the transmitter for retarding the impulses emitted from one of said radiating means with respect to the impulses emitted from the other for the purpose of modifying the beacon axis.

4. A system according to claim 2, wherein said indicating means at the receiving device comprises a cathode ray oscillograph, a time base sweep circuit for said cathode ray oscillograph, and means for synchronizing said time base circuit by received impulses.

5. A system according to claim 2, wherein said indicating means at the receiving device comprises a cathode ray oscillograph, means for scanning said cathode ray oscillograph at a frequency equal to half the impulse frequency and means for deflecting the cathode ray of said oscillograph under the control of received impulses.

6. A system according to claim 2, wherein means is provided at said receiving device for giving a visual indication of the amplitude of the received impulses.

7. A system according to claim 2, wherein said indicating means at said receiving device comprises a cathode ray oscillograph, means for imparting a circular scanning motion to the cathode ray trace thereof, means for imparting a radial deflection to said trace under the control of received impulses and concentric scales on the screen of said oscillograph for indicating distance.

8. An obstacle detection system comprising two spaced radiating means, means for emitting from said respective radiating means signal impulse wave trains of the same carrier frequency and impulse periodicity but of differing impulse duration, and a receiving device located between said spaced radiating means comprising indicating means for indicating the difference in the times of arrival of said impulses after reflection by an object to be detected.

9. A system according to claim 8, wherein said indicating means comprises a cathode ray oscillograph, a time base circuit for imparting a circular scanning trace to the cathode ray thereof and means for imparting a radial deflection to said cathode ray under the control of received impulses.

10. A beacon system for defining a course line comprising means for transmitting radio frequency energy in the form of first spaced pulses from a point on one side of said line, means for transmitting radio frequency energy in the form of second spaced pulses spaced at the same intervals as the spacing of said first pulses, from a point on the other side of said line, means for receiving energy from both said transmitting means, and visual indicator means in the output of said receiver means for indicating the relative timing of said first and second spaced pulses to provide an indication of the position of said receiver with respect to said course line.

11. A radio beacon system comprising a pulse generator for producing first spaced pulses, a first radio transmitter, means for applying said first spaced pulses to said transmitter to produce transmission of first radio frequency pulses, a second transmitter spaced from said first transmitter, means for supplying to said second transmitter spaced pulses from said pulse generator to produce transmission of second radio frequency pulses corresponding thereto, whereby the radio frequency pulse patterns from said transmitters form predetermined pulse spacing lines defining predetermined courses, a receiver for said radio frequency, and means for indicating the relative time of reception of said pulses to determine the position of said receiving means with respect to a desired one of said predetermined courses.

12. A radio beacon system according to claim 11, wherein means is provided for producing a predetermined time relation between said first radio frequency pulses, and said second radio frequency pulses to determine the position of said predetermined courses.

13. The method of providing a course line and determining the position of a craft with respect to said course, comprising radiating radio frequency energy in the form of first spaced pulses over the area including said course line, radiating other radio frequency energy in the form of second pulses spaced apart the same as said first pulses from a point spaced from the point of radiation of said first spaced pulses on the other side of said course, receiving all said pulses on said craft; producing a visual indication showing the relative time position of said first pulses and said second pulses to indicate the position of said craft with respect to said course line.

14. A beacon system for defining a course line comprising means for radiating radio frequency energy in the form of first spaced pulses from a point on one side of said line, means for radiating radio frequency second spaced pulses spaced at the same intervals as the spacing of said first pulses from a point on the other side of said line, means for receiving energy from both said radiating radio frequency means, and indicator means in the output of said receiver means for producing a visual representation of said first and second pulses in their relative time positions to provide an indication of the position of said receiver with respect to said course line.

15. In a beacon system wherein the position on a course of a receiver is indicated by comparison of the time relation of received pulses; a beacon for defining a course comprising means for transmitting discrete pulses of radio frequency energy having predetermined time spacings therebetween from a first substantially fixed position, and means for transmitting discrete pulses of radio frequency energy from a second substantially fixed position at predetermined time intervals with respect to the pulses transmitted from said first position, said time intervals being small in comparison to said time spacing.

16. In a beacon system wherein the position on a course of a receiver is indicated by comparison of the time relation of received pulses; a beacon system for defining a course comprising means for transmitting discrete pulses of radio frequency energy having predetermined time spacings therebetween from a first substantially fixed position, means for transmitting discrete pulses of radio frequency energy from a second substantially fixed position at predetermined time intervals after said pulses transmitted from said first position, said time intervals being small in comparison to said time spacings, and means for varying said time intervals.

17. An obstacle detection system comprising means for transmitting pulses of energy from a plurality of spaced points, the pulses transmitted from each point having a predetermined time relation with respect to the pulses transmitted from another of said points, means for receiving energy reflected by an obstacle to be detected and means cooperatively connected to said receiving means for indicating the relative propagation times of said transmitted and reflected energy.

18. A system according to claim 17 wherein the pulses transmitted from different points have different characteristics.

19. A beacon receiving system for indicating the position of the receiver with respect to a plurality of spaced pulse transmitting beacons comprising means for receiving pulses from the beacons, and means responsive to said receiving means for indicating the relative propagation times of said pulses comprising a cathode ray oscilloscope having means for sweeping the cathode ray means for selecting predetermined of said pulses received by said receiving means, means for synchronizing said sweeping means with said selected pulses and means for displaying said received pulses on said oscilloscope.

20. A beacon receiving system for indicating the relative position of the receiver with respect to a plurality of spaced pulse transmitting beacons comprising means for receiving pulses from the beacons and means responsive to said receiving means for indicating the relative propagation times of said pulses comprising a cathode ray oscilloscope having means for sweeping the cathode ray, means for selecting predetermined ones of said pulses received by said receiving means, means for synchronizing said sweeping means with said selected pulses and means for modulating said cathode ray with said received pulses.

21. A beacon receiving system according to claim 20, wherein said sweeping means comprises means for sweeping said cathode ray in a circle and said modulating means comprises means for deflecting said cathode ray.

22. A beacon receiving system according to claim 20, wherein said predetermined ones of said pulses have characteristics different from those of others of said pulses and said means for synchronizing comprises means for selecting pulses for predetermined characteristics.

23. A beacon receiving system according to claim 20, wherein the frequency of said sweep is equal to one-half the frequency of said predetermined pulses.

24. A radio pulse position indicating system including means for radiating synchronously discrete pulses of radio energy from a plurality of predetermined locations, remotely located receiving means including means for receiving said pulses, a source of local oscillations, a timing indicator, means connecting said source to said indicator for applying said oscillations to drive said indicator at a substantially constant rate, means connecting said receiver and local source for synchronizing said local oscillations and said pulses, and means for applying said received pulses to said indicator to indicate the differences in times of said pulse reception thereby to indicate the relative distance of said receiver from each of said predetermined locations.

25. A radio pulse position indicating system including means for radiating predetermined relatively timed discrete pulses of radio energy from a plurality of predetermined locations, remotely located receiving means including means for receiving said pulses, a source of local oscillations, a timing indicator, means connecting said source to said indicator for applying said oscillations to drive said indicator at a substantially constant angular rate, means connecting said receiver and local source for synchronizing said local oscillations and said pulses, and means for applying said received pulses to said indicator to indicate the differences in times of said pulse reception thereby to indicate the relative distance of said receiver from each of said predetermined locations.

26. A radio pulse position indicating system including means for radiating pulses of radio energy from a plurality of predetermined locations, means for synchronizing the radiation of said pulses so that all pulses are radiated in a predetermined phase relation, remotely located receiving means including means for receiving said pulses, a timing indicator, a source of oscillations, means connecting said source to said indicator for driving said indicator at a substantially constant rate, means connecting said receiving means to said indicator for applying received pulses to said indicator to denote their relative times of reception whereby the relative distance of said receiver from each of said locations may be indicated as functions of said relative times, and means connecting said source of oscillations and said receiving means for synchronizing said local oscillations and said pulse transmission.

27. A radio pulse position indicating system including means for radiating distinguishable pulses of radio energy from a plurality of predetermined locations, means for synchronizing the radiation of said pulses so that all pulses are radiated in predetermined time relation, remotely located receiving means including means for receiving said pulses, a timing indicator, a source of oscillations, means connecting said source to said indicator for driving said indicator at a substantially constant rate, means connecting said receiving means to said indicator for applying received pulses to said indicator to denote their relative times of reception whereby the distance of said receiver from each of said locations may be indicated as functions of said relative times, and means connecting said source of oscillations and said receiving means for synchronizing said local oscillations with one of said plurality of distinguishable pulse radiations.

28. A radio pulse position indicating system including means for radiating pulses of radio energy from a plurality of predetermined locations, means for synchronizing the radiation of said pulses so that all pulses are radiated in predetermined phase relation, remotely located receiving means including means for receiving said pulses, a timing indicator, a source of oscillations, means for adjusting the frequency of said oscillations, means connecting said source to said indicator for driving said indicator at a substantially constant rate, and means connecting said receiving means to said indicator for applying received pulses to said indicator to denote the relative times of reception of said pulses whereby the difference in the distances between said locations and said remotely located receiving means may be indicated.

29. In a system for determining the position of a movable body with respect to an axis, two radio electric transmitters of different characteristics located on either side of said axis for transmitting each a series of electromagnetic wave pulses periodically emitted in synchronism; and means on said movable body for receiving and detecting said pulses, including an oscillograph for representing upon a time base the interval between reception of related pulses, thereby to determine the deviation of said body from said axis.

30. In a system for determining the position of a movable body with respect to an axis, two radio transmitters located on either side of said axis for transmitting each a series of electromagnetic wave pulses having the same repetition rate and a predetermined time relationship, and means on said movable body for receiving said pulses including cathode ray means under control of said series of pulses for representing as luminous spots the time interval between reception of said series.

References Cited in the file of this patent

UNITED STATES PATENTS

| | | |
|---|---|---|
| 1,961,767 | Key | June 5, 1934 |
| 1,968,068 | Blanchard | July 31, 1934 |
| 1,998,834 | Englund | Apr. 23, 1935 |
| 2,143,035 | Smith | Jan. 10, 1939 |
| 2,176,469 | Moueix | Oct. 17, 1939 |
| 2,189,549 | Hershberger | Feb. 6, 1940 |
| 2,190,039 | Neufeld | Feb. 13, 1940 |
| 2,204,438 | Neufeld | June 11, 1940 |
| 2,208,422 | Hugon | July 16, 1940 |
| 2,218,907 | Donnelly | Oct. 22, 1940 |
| 2,227,155 | Plebanski | Dec. 31, 1940 |
| 2,312,761 | Hershberger | Mar. 2, 1943 |
| 2,403,626 | Wolff et al. | July 9, 1946 |

FOREIGN PATENTS

| | | |
|---|---|---|
| 18,753 of 1898 | Great Britain | June 22, 1899 |
| 700,525 | France | Dec. 23, 1930 |
| 803,926 | France | July 20, 1936 |